Figure 1:
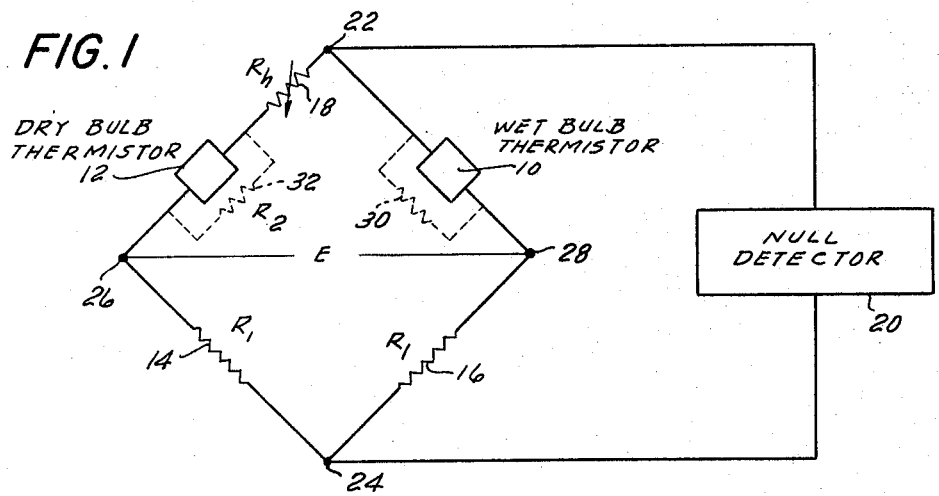

June 20, 1967     F. L. WARD     3,326,044

HUMIDITY INDICATING DEVICE

Filed Oct. 21, 1965

INVENTOR.
FRANK L. WARD.

BY

ATTORNEY 3,326,044
HUMIDITY INDICATING DEVICE
Frank L. Ward, Exeter, N.H., assignor to
Joseph C. Sullivan, Garden City, N.Y.
Filed Oct. 21, 1965, Ser. No. 499,918
15 Claims. (Cl. 73—336.5)

This invention relates generally to devices for measuring and controlling humidity and more particularly, to a single device which develops an electrical output signal in response to and as a function of deviations of humidity from a predetermined value.

Devices in use today for the measurement of relative humidity for the most part utilize the wet and dry bulb thermometer-technique. In this procedure the ambient temperature is measured by a dry bulb and the temperature of a water saturated wick or wet bulb subjected to the same ambient is measured. The wick will have a lower temperature due to evaporation. The temperature difference between the dry bulb and the wick are recorded, and by referring to a psychrometric chart, the percentage relative humidity can be determined.

The wet and dry bulb thermometer procedure is satisfactory for the general measurement of relative humidity. However, if it is necessary to control humidity, this procedure must be carried out automatically by an instrument that can provide a control signal for the humidity adjusting equipment.

There are three methods that are commonly used in industry today. The first method is used in situations where the ambient temperature is constant or controlled. A circuit is arranged that will subtract the signals of a wet and a dry thermocouple. The difference signal can be calibrated in terms of percent relative humidity. The accuracy of the method is determined by the degree of control of the ambient temperature. For example, if the equipment is calibrated in an ambient temperature of 70° F. an error of approximately 1 percent in relative humidity will occur for every 1° F. change in ambient temperature when controlling in the region of 40 percent relative humidity. This method can become, due to equipment requirements, very expensive if close control is desired. It is not practical in cases where the ambient temperature is allowed to continually change.

The second method is used in cases where it is not practical or desirable to control the ambient temperature. The wet and dry thermocouple instrument is equipped with an electro-mechanical circuit which will compensate for changes in ambient temperature. This adds to the complexity and cost.

The third approach relies upon component design. In an effort to reduce the complexity of the instrumentation the industry has developed a number of humidity sensitive resistors. These have met with various degrees of success, and although most of them must be compensated for ambient temperature, the better quality elements provide a means of reducing circuit complexity in many applications. These humidity sensitive resistive elements cannot be conveniently checked in the field. A point by point check with a hygrometer must be applied.

The object of the present invention is to provide a simple and inexpensive device with which variations in humidity will be accurately and immediately indicated and which will in response thereto, develop an electrical signal which can be utilized to operate an indicator or to operate compensating equipment as an integral part of a "closed loop" system.

It is a further object of this invention to provide a device which will give an electrical output signal that is indicative of relative humidity regardless of ambient temperature.

Figure 2:
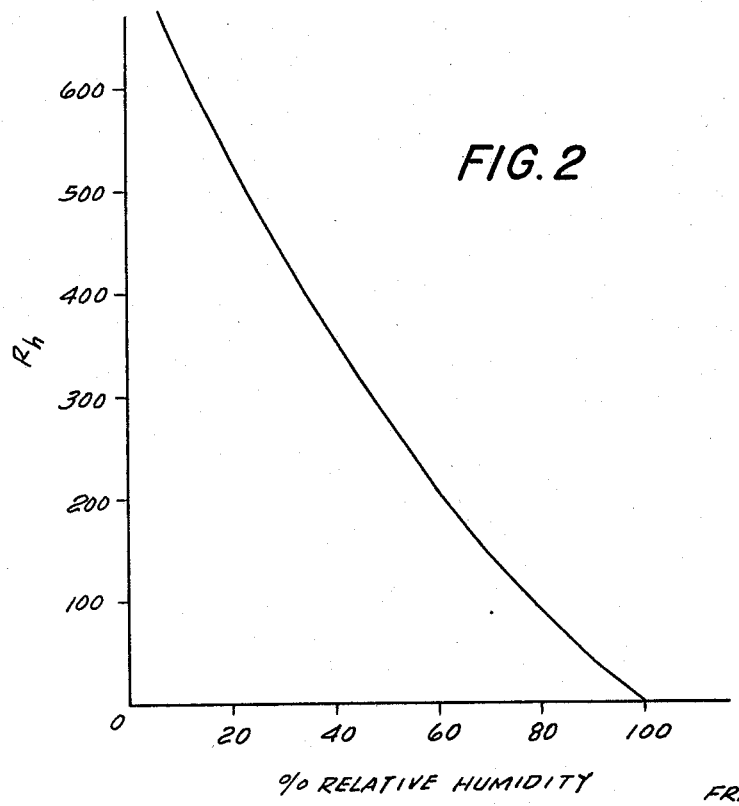

A humidity indicating device constructed in accordance with the teachings of this invention and the method of using the same is described herein with reference to the drawings in which:

FIG. 1 is a schematic of a humidity indicating device constructed in accordance with the teachings of this invention; and FIG. 2 is a curve illustrating the characteristics of the circuit shown in FIG. 1, with $R_h$ adjusted.

It is well known in the art that a broad group of negative temperature coefficient thermistors respond to the following formula:

$$R = R_0 eB\left(\frac{1}{T} - \frac{1}{T_0}\right)$$

where:
$R$ = resistance at temperature T (degrees Rankine)
$R_0$ = resistance at temperature $T_0$ (degrees Rankine)
$B$ = beta (degrees Rankine)
$e$ = Naperian base 2.718

The "constant" B can be treated as a constant over a limited temperature range.

In FIG. 1 a pair of thermistors indicated by the numerals 10 and 12 are connected in a bridge circuit wherein the numerals 14 and 16 indicate the resistors in the remaining legs of the bridge and the numeral 18 indicates a variable or trimming resistance in series with thermistor 12. A null detector is indicated by the numeral 20 connected across the points 22 and 24 wherein the numeral 22 indicates the point between the legs provided by thermistor 10 and thermistor 12 and 18 in series and point 24 is the point between the legs provided by resistances 14 and 16. The remaining points 26 and 28 of the bridge circuit wherein point 26 lies between the legs provided by resistance 14 and the series combination of thermistors 12 and 18, and 28 is the point lying between the legs provided by resistance 16 and resistance 10.

In this circuit thermistor 10 is wrapped in a water saturated wick to provide a wet bulb thermistor. Thermistor 12 is the dry bulb thermistor. Both are placed in the zone wherein the relative humidity is of interest and the difference in resistance between the wet and dry bulb thermistors 10 and 12 respectively, will give a value that is indicative of relative humidity regardless of ambient temperature.

For example, if in the circuit of FIG. 1 each of the thermistors 10 and 12 is measured at 1000 ohms at 77° F. and has a beta of 5200° Rankine the resistance value of resistor 18 at null will be inversely proportional to the percentage relatively humidity as shown in FIG. 2. The selected value of 5200° Rankine for beta is optimum for this circuit. However, it is a specially calculated value and standard thermistors are produced today with a beta of 7000° Rankine. If a thermistor with a beta of approximately 7000° R. is utilized and shunted by a suitable value resistance, such as a resistance of the value of approximately 10,000 ohms in FIG. 1 wherein the numeral 30 indicates the shunt resistance for thermistor 10 and the numeral 32 indicates the shunt resistance for thermistor 12, the results will be substantially similar to the results shown in FIG. 2 which is the average of several curves representing several ambient temperatures. All curves fall within a plus or minus 2 percent range of the curve shown in FIG. 2, between humidity ranges of 5 to 100 percent and ambient temperatures between 60° F. and 80° F. Shunting resistors 30 and 32 are used when the beta is different than the optimum of 5200° Rankine and the higher the beta, the lower the shunting resistor which is used.

As an example of use, referring to FIG. 1, if it is desired to control humidity, variable resistor $R_h$ would be set at the desired humidity (calibrated dial). The null detector would sense a bridge off-balance and actuate a relay or similar device which in turn would actuate the humidity adjusting equipment. When the pre-selected humidity is reached the bridge is balanced and the relay will cut out ready for another cycle.

In the above example there is "an electrical output signal" from the device, however, if we wish to use the device as a humidity indicator the output is actually the angular position of the potentiometer shaft ($R_h$) as represented by the dial calibration. This angular position is effected by manual adjustment to a "null" or by automatic adjustment with a servo motor or similar device.

It is possible that the voltage output of the bridge could be a function of humidity without the use of $R_h$, however, in order to obtain a reasonable degree of accuracy it is preferred that the bridge work close to the "null" point. In order to do this $R_h$ is required.

The bridge circuit will not make a direct measurement of the difference in resistance between the two thermistors. Even if the output voltage is a function of humidity the voltage vs. humidity could be extremely non-linear and be subject to variations in line voltage and loading variations in the detection amplifier.

It is seen therefore that the nonlinear characteristic of the thermistor when used in a circuit as disclosed, provides a practical means to measure and control humidity having all of the advantages of the wet and dry bulb method without requiring expensive or complex instrumentation and providing compensation for ambient temperature.

Although a bridge circuit utilizing thermistors is shown and described herein as a preferred embodiment of the invention, it should be noted that other temperature transducers which have a rate of change which is not linear with temperature but which exhibits a rate of change versus ambient which follows the same pattern as the difference of wet and dry bulb temperature over ambient range may be used. Obviously, numerous changes in construction and rearrangement of parts might be resorted to without departing from the spirit of the invention as defined by the claims.

I claim:

1. A humidity indicating device including in combination first and second resistance elements, moisture absorbent wick-like material wrapped around said first resistance element to provide a film of moisture which can continuously evaporate, means for measuring the difference in resistance between said first and second resistance elements, and each of said resistance elements having a resistance versus temperature coefficient which varies as a function of ambient temperature at the same rate as the difference between wet and dry bulb temperature varies with variations in ambient temperature.

2. A humidity indicating device including in combination first and second resistance elements, moisture absorbent wick-like material wrapped around said first resistance element to provide a film of moisture which can continuously evaporate, means for measuring the difference in resistance between said first and second resistance elements, and each of said resistance elements having a resistance versus temperature coefficient which varies as a function of ambient temperature in the same manner as the difference between wet and dry bulb temperature varies with variations in ambient temperature.

3. A humidity indicating device in accordance with claim 2 in which said first and second resistance elements each has a negative temperature coefficient which varies as a function of ambient temperature at the same rate as the difference between wet and dry bulb temperature varies with variations in ambient temperature.

4. A humidity indicating device in accordance with claim 3 in which each of said first and second resistance elements is a thermistor.

5. A humidity indicating device in accordance with claim 3 in which each of said first and second resistance elements is a thermistor having a beta of 7000° Rankine.

6. A humidity indicating device in accordance with claim 3 in which each of said first and second resistance elements is a thermistor having a beta 5200° Rankine.

7. In a humidity indicating device including in combination first, second, third and fourth resistance elements arranged in a bridge circuit, first, second, third and fourth common points between respectively said first and second resistance elements, said second and third resistance elements, said third and fourth resistance elements and said fourth and first resistance elements, means for providing a voltage between said second and said fourth common points and sensing means for sensing a voltage between said first and said third common points, that improvement consisting of said first and second resistance elements having a resistance versus temperature coefficient which varies as a function of ambient temperature at the same rate as the difference between wet and dry bulb temperatures varies with variations in ambient temperature and a moisture absorbent wick-like material wrapped around said first resistance element to provide a film of moisture which can continuously evaporate.

8. In a humidity indicating device including in combination first, second, third and fourth resistance elements arranged in a bridge circuit, first, second, third and fourth common points between respectively said first and second resistance elements, said second and third resistance elements, said third and fourth resistance elements and said fourth and first resistance elements, means for providing a voltage between said second and said fourth common points and sensing means for sensing a voltage between said first and said third common point, that improvement consisting of said first and second resistance elements having a resistance versus temperature coefficient which varies as a function of ambient temperature in the same manner as the difference between wet and dry bulb temperature varies with variations in ambient temperature and a moisture absorbent wick-like material wrapped around said first resistance element to provide a film of moisture which can continuously evaporate.

9. In a humidity indicating device including in combination first, second, third and fourth resistance elements arranged in a bridge circuit, first, second, third and fourth common points between respectively said first and second resistance elements, said second and third resistance elements, said third and fourth resistance elements and said fourth and first resistance elements, means for providing a voltage between said second and said fourth common points and sensing means for sensing a voltage between said first and said third common points, that improvement consisting of said first and second resistance elements having a negative temperature coefficient which varies as a function of ambient temperature at the same rate as the difference between wet and dry bulb temperature varies with variations in ambient temperature.

10. In a humidity indicating device including in combination first, second, third and fourth resistance elements arranged in a bridge circuit, first, second, third and fourth common points between respectively said first and second resistance elements, said second and third resistance elements, said third and fourth resistance elements and said fourth and first resistance elements, means for providing a voltage between said second and said fourth common points and sensing means for sensing a voltage between said first and said third common points, that improvement consisting of said first and second resistance elements each being a thermistor and a moisture absorbent wick-like material wrapped around said first resistance element to provide a film of moisture which can continuously evaporate.

11. In a humidity indicating device including in combination first, second, third and fourth resistance elements arranged in a bridge circuit, first, second, third and fourth common points between respectively said first and second resistance elements, said second and third resistance elements, said third and fourth resistance elements and said fourth and first resistance elements, means for providing a voltage between said second and said fourth common points and sensing means for sensing a voltage between said first and said third common points, that improvement consisting of said first and second resistance elements each being a thermistor having a beta of 7000° Rankine and a moisture absorbent wick-like material wrapped around said first resistance element to provide a film of moisture which can continuously evaporate.

12. In a humidity indicating device including in combination first, second, third and fourth resistance elements arranged in a bridge circuit, first, second, third and fourth common points between respectively said first and second resistance elements, said second and third resistance elements, said third and fourth resistance elements and said fourth and first resistance elements, means for providing a voltage between said second and fourth common points and sensing means for sensing a voltage between said first and said third common points, that improvement consisting of said first and second resistance elements each being a thermistor having a beta 5200° Rakine and a moisture absorbent wick-like material wrapped around said first resistance element to provide a film of moisture which can continuously evaporate.

13. In a humidity indicating device including in combination first, second, third and fourth resistance elements arranged in a bridge circuit, first, second, third and fourth common points between respectively said first and second resistance elements, said second and third resistance elements, said third and fourth resistance elements and said fourth and first resistance elements, means for providing a voltage between said second and said fourth common points and sensing means for sensing a voltage between said first and said third common points, that improvement consisting of said first and second resistance elements having a resistance versus temperature coefficient which varies as a function of ambient temperature at the same rate as the difference between wet and dry bulb temperature varies with variations in ambient temperature, a moisture absorbent wick-like material wrapped around said first resistance element to provide a film of moisture which can continuously evaporate and actuating means controlled by said sensing means.

14. A humidity indicating device including in combination first and second resistance elements, moisture absorbent wick-like material wrapped around said first resistance element to provide a film of moisture which can continuously evaporate, means for measuring the difference in resistance between said first and second resistance elements, and each of said resistance elements having a temperature coefficient of resistance which varies at the same rate, but inversely to the difference between wet and dry bulb temperature, with variations in ambient temperature.

15. In a relative humidity indicating or sensing device including in combination first, second, third and fourth resistance networks arranged in a bridge circuit, first, second, third and fourth common points between respectively said first and second resistance networks, said second and third resistance networks, said third and fourth resistance networks and said fourth and first resistance networks, means for providing a voltage between said second and said fourth common points and sensing means for sensing a voltage between said first and said third common points, that improvement consisting of said first resistance network being an element having a temperature coefficient of resistance which varies at the same rate, but inversely to the difference between the wet and dry bulb temperatures, with variations in ambient temperature and a moisture absorbent wick-like material wrapped around said element, maintaining a film of moisture which can continuously evaporate, said second resistance network consisting of a variable resistance element for bridge balancing means in series with an element having a temperature coefficient of resistance which varies at the same rate, but inversely to the difference between the wet and dry bulb temperatures, with variations in ambient temperature.

References Cited
UNITED STATES PATENTS

| | | | |
|---|---|---|---|
| 1,855,774 | 4/1932 | Schneider | 73—336.5 |
| 2,541,219 | 2/1951 | Dueringer | 236—44 |
| 2,603,972 | 7/1952 | Kahn | 73—336.5 |
| 2,845,790 | 8/1958 | Eddy | 72—29 |
| 3,110,173 | 11/1963 | Bishop | 73—29 X |

LOUIS R. PRINCE, *Primary Examiner.*

J. NOLTON, *Assistant Examiner.*